United States Patent [19]

Ballone

[11] 4,199,009
[45] Apr. 22, 1980

[54] CONDUIT SADDLE

[75] Inventor: Leslie F. Ballone, River Forest, Ill.

[73] Assignee: Kyova Corporation, Columbus, Ohio

[21] Appl. No.: 702,884

[22] Filed: Jul. 6, 1976

[51] Int. Cl.² ............................. F16L 9/18; F16L 9/20
[52] U.S. Cl. ................................... 138/112; 285/188
[58] Field of Search ............... 138/111, 112, 113, 114, 138/106; 285/23, 188; 248/68 R, 68 CB, 69

[56] References Cited

U.S. PATENT DOCUMENTS

| | | | |
|---|---|---|---|
| 1,799,672 | 4/1931 | Burke et al. | 138/112 X |
| 1,799,673 | 4/1931 | Burke et al. | 138/112 |
| 1,801,451 | 4/1931 | Parker | 138/112 |
| 1,868,881 | 7/1932 | Burke et al. | 138/112 X |
| 2,039,387 | 5/1936 | Burke et al. | 138/112 |

FOREIGN PATENT DOCUMENTS

| | | | |
|---|---|---|---|
| 335678 | 10/1903 | France | 138/112 |
| 676152 | 2/1930 | France . | |
| 490521 | 2/1954 | Italy | 285/188 |

*Primary Examiner*—Richard E. Aegerter
*Assistant Examiner*—James E. Bryant, III
*Attorney, Agent, or Firm*—Van D. Harrison, Jr.

[57] ABSTRACT

Disclosed are saddles for retaining a number of ducts in rectangular bundles. Each saddle in cross section is four-sided. Each side is concave and of the same radius as the ducts being bundled.

4 Claims, 5 Drawing Figures

1

CONDUIT SADDLE

NATURE OF THE INVENTION

This invention relates to bundled units of ducts and to means for maintaining the bundled configuration of said units.

BACKGROUND OF THE INVENTION

In the laying of underground cables for telephones, power transmissions and the like, wires and cables are frequently led through a number of parallel ducts. Although it is possible to use asbestos-cement, ceramic, steel or pitch-impregnated fiber pipe for this purpose, the most popular material is duct made by extruding plastic material. Twenty-foot lengths of the plastic duct can be cemented end-to-end above ground and a number of the parallel strings thus formed bundled together at spaced intervals by tight flexible bands. The bundles thus formed can then be lowered into a prepared trench and the trench backfilled.

If parallel strings of flexible or semiflexible duct lengths are bundled together so that adjacent ducts are in mutual tangential contact throughout their lengths, deflection of the individual ducts can be minimized. If the ducts at the same time can be maintained in a square or rectangular pattern, the depth and width of the trench that is required to accommodate the bundled duct strings will be at an optimum.

A primary object of this invention, therefore, is to facilitate positioning and maintaining bundled ducts in a square or rectangular cross-sectional pattern during and after the operation of burying them in a trench or positioning them in an above-ground installation. Still another object of this invention is to provide a means for positioning subterranean bundled ducts so that each duct throughout its length is in tangential contact with adjacent ducts, thereby distributing the earth load in a downward, outward and even manner.

I am aware that U.S. Pat. Nos. 1,799,673 and 1,868,881 disclose bundles of ducts arranged in square arrays. In these patents the ducts in each bundle are disclosed to be separated from each other by four-sided spacers. In cross section each side of each spacer is concave and describes a circular arc of the same radius as the ducts making up the bundle. If a bundle of ducts is assembled incorporating the spacers of U.S. Pat. Nos. 1,799,673 and 1,868,881 and installed below ground level each individual duct is subjected over its entire surface to the burden and pressures of the overlying and surrounding backfill material, thus making each duct more susceptible to deformation and deflection. There is also a concentration of forces at the areas of contact between the spacers and ducts. This concentration of forces can lead to additional deformation and crushing of the duct at the areas of contact. This crushing and displacement of the individual ducts occurs because of the lack of continuous longitudinal tangential contact between adjacent ducts. If, however, a below-ground installation of bundled ducts is made so that each duct is maintained in continuous longitudinal tangential contact with adjacent ducts and/or backfill material, load forces tend to be distributed evenly and equally throughout the entire duct bundle.

SUMMARY OF THE INVENTION

Briefly stated, this invention comprises, in one aspect, a saddle for maintaining ducts in a rigid rectangular bundle and for preventing the bundle from assuming a more easily attained circular bundle form. The saddle comprises in cross section, a four sided member, the exterior or each side being concave, having an arc radius equal to that of the ducts to be bundled and spanning an arc length of less than 90 degrees. In another aspect, this invention comprises the duct bundle made by combining the saddles of this invention with ducts.

DESCRIPTION OF THE INVENTION

Figures 1, 2:
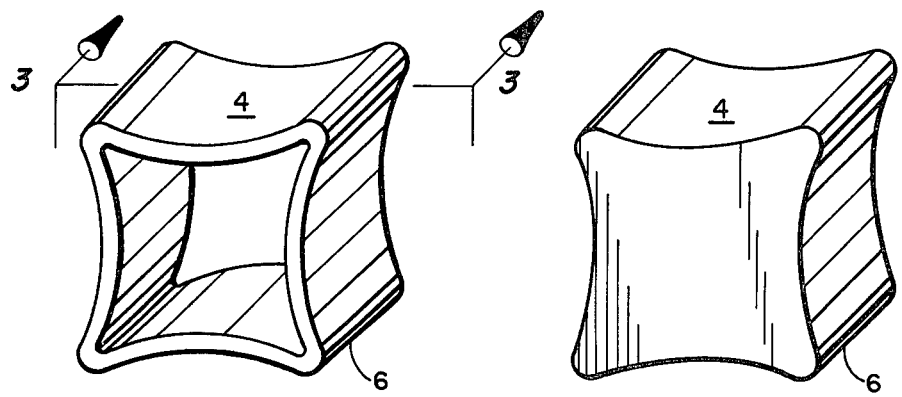
FIG. 1 is a perspective view of one form of the saddle of this invention which may be employed between individual duct sections.
FIG. 2 is a perspective view of another form of saddle.
Figures 3, 5:
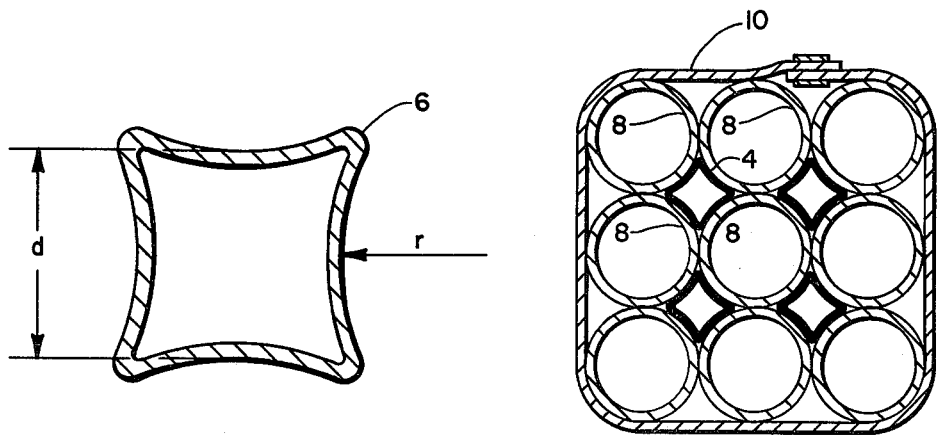
FIG. 3 is a cross section of the saddle of FIG. 1.
FIG. 5 is a transverse sectional view of the bundle of ducts taken along lines 5—5 in FIG. 4.

Referring now to FIGS. 1 and 3 of the drawings, the saddle in the most preferred form of the invention is made up of four rigid concave walls, the radius of curvature, r, of each wall corresponding approximately to the outside radius of the ducts to be bundled. FIG. 5 is a cross sectional view of a bundle of 9 ducts shown in the perspective view of FIG. 4. FIG. 5 illustrates a most important feature of the saddle of this invention. The saddles 4 are of a proper proportion so that they will fit snugly between adjacent ducts 8 but will permit the ducts to contact each other lengthwise. This requirement is met if the radius of curvature r of each side of the concave wall is sized to correspond with the outside diameter of the ducts to be bundled and if the minimum width "d" measured across the center points of two opposing sides of the saddle as indicated in FIG. 3 is sized to be equal to $(\sqrt{2}-1)D$, approximately 0.414D is the external diameter (2r) of the ducts to be bundled. The tips or points 6 of the saddle preferable are rounded for ease in manufacture and handling. The arc measured by each of the curved sides must be less that 90 degrees. FIG. 2 is a less desired but nevertheless useful embodiment of the saddle of this invention and is a solid shape rather than the rigid walled version of FIG. 3.

The preferred form of saddle is the thick walled, open ended type shown in FIG. 1. A less preferred form is the solid block form shown in FIG. 2. The material from which the ducts of this invention are constructed can be plastic materials such as polyethylene, polypropylene, polybutylene, polyvinyl chloride, polystyrene, acrylonitrile-butadienestyrene, melamines and phenolics. The preferred form shown in FIG. 1 can be made by a simple extrusion or injection molding process.

To assemble a duct bundle, lengths of duct are laid out, and as many parallel strings as desired are assembled by coupling the individual duct lengths together. The strings are then bunched and saddles like those shown in FIG. 1 and FIG. 2 are inserted between each group of four ducts. It has been practical to position these saddles at about every ten feet, but greater or lesser distances may be employed. A band is then tightened around the assembly, preferably directly over the location of the saddles. When the bundle has been tied at the desired number of intervals, the bundle is ready to be lowered into the receiving trench and to be buried.

Figure 4:
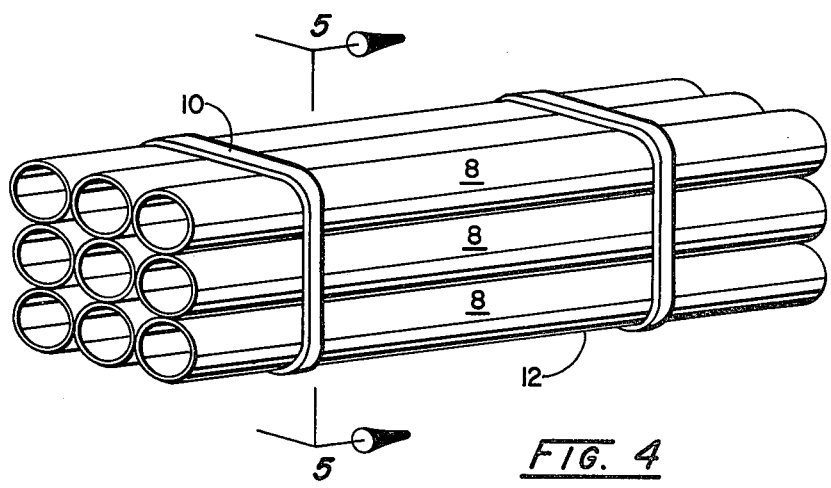
FIG. 4 is a perspective view of a section of a bundle of ducts embodying the preferred form of saddle of this invention.

In assembling a bundle of duct strings, it is desirable, as noted before, that the individual ducts be in direct contact lengthwise with all adjacent ducts. Under these conditions of direct contact, compressive forces from the overburden of soil are evenly distributed over all ducts promoting a longer life for the duct installation and minimizing the deformation of any ducts. FIGS. 4 and 5 depict a section of a bundle of 9 strings of ducts. Reference numeral 8 designates the individual ducts positioned by retainers 4 and held rigidly in place by bands 10.

Field trials of hand-crafted saddles have demonstrated their utility. In the first test, thirty samples of the type shown in FIG. 1 were handmade by cementing together arc segments of plastic ducts and used in an underground installation. When this test proved successful, a second group of 400 hand-crafted samples were tested in one installation and a third group of the same number in another installation. In each of these tests the saddles of this invention made it possible to assemble the bundle of ducts above ground into the desired rectangular array at the edge of the trench dug to receive the duct bundles. It was then possible to lower the bundle into the trench while still maintaining its rectangular shape without the necessity of workmen in the trench and subsequently to backfill over the bundle without disturbing the rectangular configuration.

Although the main part of the foregoing specification has been directed to subsurface installations, it is to be understood that this invention is equally applicable to above ground installations where it is desirable to maintain a bundle of ducts in a rectangular shape.

I claim:

1. A saddle for supporting a plurality of circular conduits of equal exterior diameter, 2 r, comprising in cross section a figure having four external concave sides, each side describing an arc of less than 90 degrees and having a constant radius r equal to one half the exterior diameter of said circular conduits, and having a width as measured across the mid part of two opposing sides of $(\sqrt{2}-1) \times 2r$.

2. The saddle of claim 1 wherein said sides of said saddle are concave rigid arcuate walls.

3. The saddle of claim 1 wherein said saddle is a solid block.

4. A duct bundle comprising a plurality of ducts of external diameter equal to 2r, a plurality of the saddles of claim 1 contained between said ducts and positioning said ducts so that they are in tangential contact throughout their length, and a plurality of bands tightly surrounding said bundle.

* * * * *